United States Patent [19]
Crutzen et al.

[11] Patent Number: 5,599,473
[45] Date of Patent: Feb. 4, 1997

[54] NITROGEN-FREE RINSE CYCLE FABRIC SOFTENERS BASED ON MICROEMULSIONS

[75] Inventors: André Crutzen, Liege-Sclessin; France Wouters, Liers, both of Belgium

[73] Assignee: Colgate-Palmolive Company, New York, N.Y.

[21] Appl. No.: 286,036

[22] Filed: Aug. 4, 1994

[51] Int. Cl.$^6$ ............................................ B01J 13/00
[52] U.S. Cl. ............................. 252/8.63; 252/312
[58] Field of Search .................. 252/312, 8.6, 8.7, 252/8.9, 8.63; 106/243, 244, 287.24

[56] References Cited

U.S. PATENT DOCUMENTS

| | | | |
|---|---|---|---|
| 3,928,212 | 12/1975 | Goto et al. | 252/8.6 |
| 4,126,562 | 11/1978 | Goffinet et al. | 252/8.8 |
| 4,142,978 | 3/1979 | Murray et al. | 252/8.7 |
| 4,146,499 | 3/1979 | Rosano | 252/312 |
| 4,472,291 | 9/1984 | Rosano | 252/312 |
| 5,035,826 | 7/1991 | Durbut et al. | 252/121 |
| 5,075,026 | 12/1991 | Loth et al. | 252/171 |
| 5,126,060 | 6/1992 | Puentes-Bravo et al. | 252/8.6 |
| 5,154,754 | 10/1992 | Damo et al. | 252/312 |

*Primary Examiner*—Melissa Bonner
*Attorney, Agent, or Firm*—Bernard Lieberman; James M. Serafino

[57] ABSTRACT

Anionic microemulsions of hydrophobic, normally liquid, oxygenated, long chain hydrocarbons have been found to provide nitrogen-free rinse cycle fabric softener compositions. Fatty acid esters of polyols, such as triglycerol diisostearate and sorbitan isostearate, are preferred softeners especially when microemulsified with an anionic surfactant, a cosurfactant and optionally a nonionic surfactant.

7 Claims, 4 Drawing Sheets

5% TRIGLYCEROL DIISOSTEARATE 84% WATER

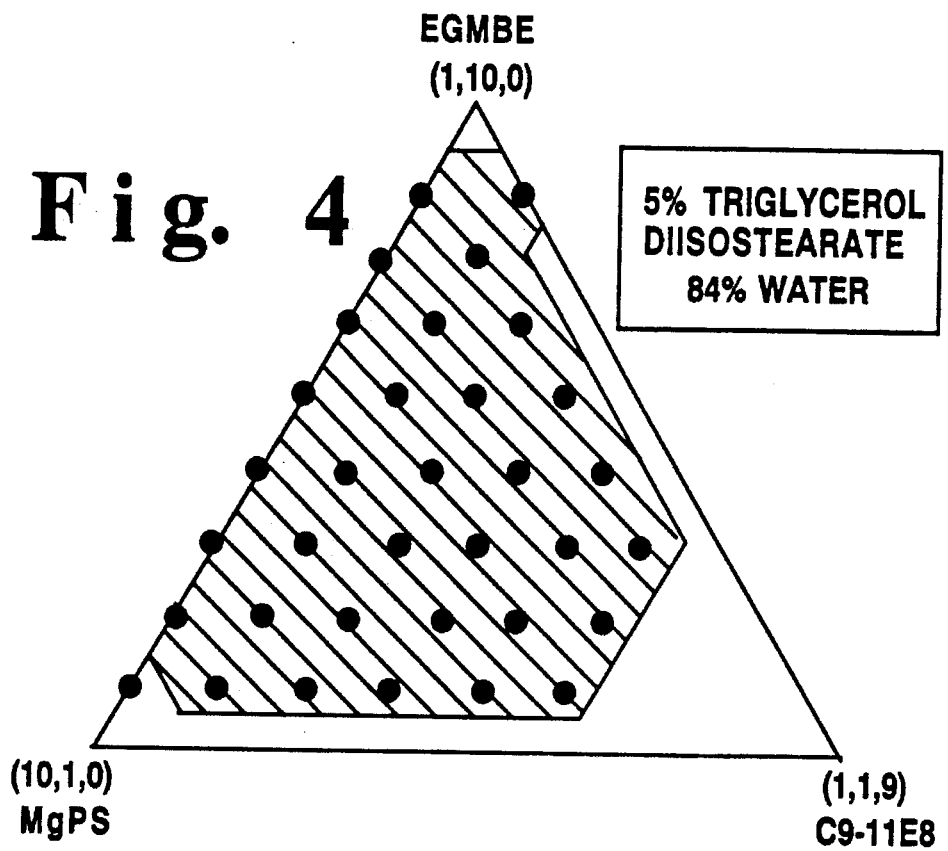
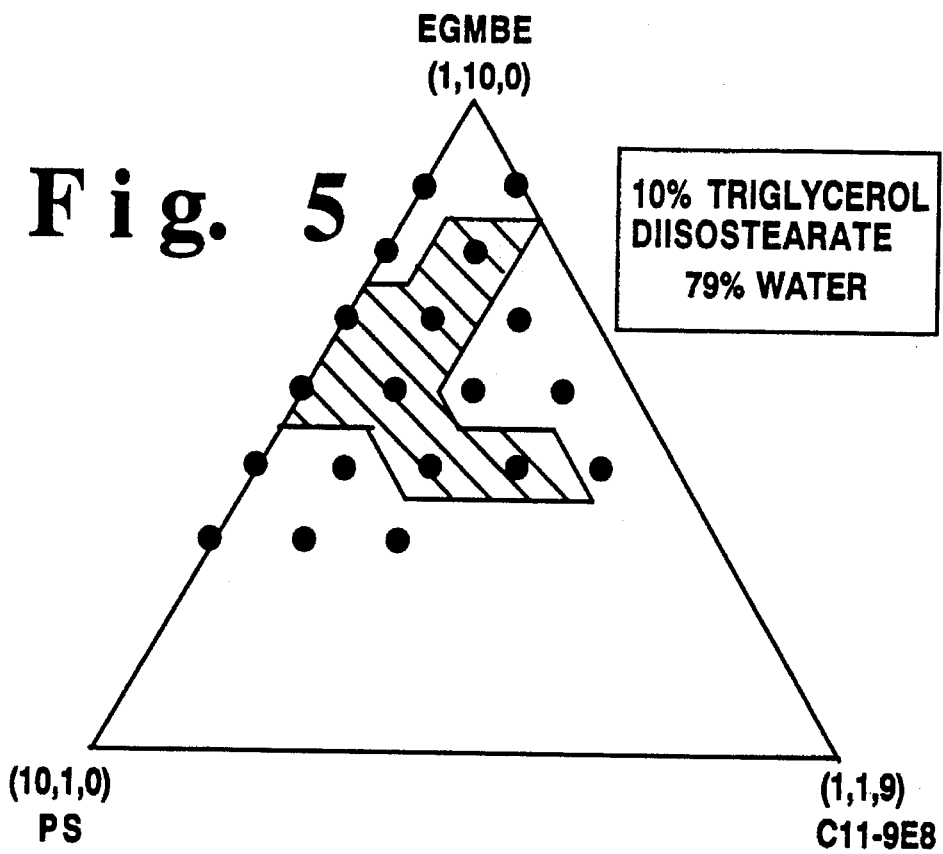

NITROGEN-FREE RINSE CYCLE FABRIC SOFTENERS BASED ON MICROEMULSIONS

BACKGROUND OF THE INVENTION

1. Field of the Invention

This invention relates to nitrogen-free rinse cycle fabric softeners and more particularly to said softeners in the form of microemulsions which upon dilution with water release hydrophobic materials. These hydrophobic materials can be long chain oxygenated hydrocarbons, such as long chain esters, polyols and the like.

2. Description of Related Art

Fabric softening compositions and articles have long been employed to make washed laundry items softer to the touch and more comfortable to the wearer. Such compositions include solutions, emulsions, and particulate and powder products. Fabric softening articles include paper strips that have been impregnated with fabric softening compositions. Until recently, most of the commercially available rinse cycle fabric softeners were based on quaternary ammonium salts referred to broadly as Quats. These Quats are very hydrophobic, cationic surface-active agents. A commonly used example is dimethyl ditallowyl ammonium chloride. Now however these Quats are being banned from use because of ever increasing environmental restrictions.

Emulsions of fabric softening agents have been added to the rinse water of washing machines to soften laundry articles. Alternatively, such agents have been added to the wash water together with a detergent composition or the detergent composition can include a softening component to provide a "softergent". Fabric softening components, such as Quats, provide softening to fabric sheets in an automatic laundry dryer during tumbling in a heated environment.

The Quats may be represented by the formula:

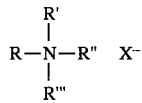

wherein R, R', R", and R'" are all alkyl groups, with at least one such alkyl groups being a higher alkyl having at least about eight carbon atoms and with the rest being lower alkyls having one or two carbon atoms, and with X$^-$ being a salt forming anion. The preferred Quats have been quaternary ammonium salts of di-lower alkyl and di-higher alkyl ammonium halides although mono-lower and tri-higher alkyl ammonium halides have also been used.

In addition to contributing to environmental problems, the Quats have other undesirable properties that militate against their use. For example, being cationic, they tend to react with anionic materials and thereby negate their intended fabric softening function. Moreover, they are not as readily biodegradable as is desirable. They also have been found to be toxic to aquatic organisms leading to harmful effects on aquatic life in lakes, rivers and other into which waste waters carrying such compounds might be emptied.

In past efforts to find replacements for quaternary ammonium salts as fabric softeners, such candidates as neoalkanamides, glyceryl esters, silicones, cationic-anionic complexes, bentonite and various lubricants have been suggested alone or in conjunction with quaternary ammonium salts. These measures have not been satisfactory because of a diminution of the softening effects or because they introduced other undesirable properties to the softening compositions.

In order to be efficient, a softening composition must fulfill at least two conditions. These compositions must:

(1) exhibit physical and chemical stability during storage in warehouses and on store shelves. Physical stability is defined herein to mean that no phase separation can occur.

(2) release the active softening ingredients, during the laundry rinse cycle, so that they deposit on the laundered fibers within a reasonable time.

Several attempts have previously been made to meet these conditions and to solve the drawbacks of the known fabric softening systems.

U.S. Pat. No. 3,928,212 describes softening agents which are polyhydric alcohol esters.

U.S. Pat. No. 4,126,562 mentions erythritol and pentaerythritol which may be reacted with higher fatty acids to produce fabric softeners.

It is therefore an object of this invention to provide rinse cycle fabric softeners that are nitrogen free.

It is another object to provide such nitrogen-free softeners in a physical form that renders them physically and chemically stable.

It is a further object that such softeners upon dilution with water become quickly available for deposition on fiber surfaces.

Still another object is to provide nitrogen-free softeners that meet environmental standards including biodegradability.

Other objects will become apparent to those skilled in the art upon a further reading of the specification.

SUMMARY OF THE INVENTION

Nitrogen-free rinse cycle softener compositions have been found meeting the objects supra comprising an anionic microemulsion of a hydrophobic, normally liquid oxygenated long chain hydrocarbon. The term "anionic microemulsion" is used to mean a microemulsion comprising at least one anionic surfactant. By normally liquid is meant liquid at ambient room temperature. These hydrophobic, normally liquid oxygenated hydrocarbons may be fatty esters of polyols, fatty alcohols, fatty acids or fatty ethers. The term "fatty" refers to long chain hydrocarbon moieties having about 12 to about 22 carbon atoms. The preferred oxygenated hydrocarbons used in this invention are fatty ester polyols where the polyol moiety contains two or more hydroxyl and carbon atoms and at least one hydroxyl group is esterified with a fatty acid containing 12 to about 22 carbon atoms. While the preferred oxygenated hydrocarbons are fatty ester polyols, the use of anionic microemulsions of C12–C14 fatty alcohols, has also been demonstrated as being effective for softening under standard laboratory conditions.

Exemplary fatty acids include the saturated fatty acids: lauric acid, tridecylic acid, myristic acid, pentadecylic acid, palmitic acid, margaric acid, stearic acid, nondecylic acid, arachidic acid, behenic acid and the like. Unsaturated acids that can be used include: dodecylenic acid, palmitoleic acid, oleic acid, recinoleic acid, petroselinic acid, vaccenic acid, linoleic acid, eleostearic acid, licanic acid, parinaric acid, tariric acid, gadoleic acid, arachadonic acid, cetoleic acid, erucic acid, and the like.

In addition to the normal fatty acids delineated above, one may also use various isomers thereof in which the hydrocarbon moieties are branched rather than straight chained as well as mixtures of fatty acids. Commercially available U.S.P. stearic acid, for example, contains a mixture of stearic acid and palmitic acid.

Two particularly preferred classes of polyols are triols, such as, glycerol as well as dimers or trimers thereof including diglycerol and triglycerol and hexitols, such as, sorbitol, mannitol, iditol, dulcitol, talitol and the like. Anhydrides of hexitols, such as sorbitan are particularly preferred.

Other polyols useful in the practice of this invention are penitols, such as, xylitol, arabitol, adonitol, and the like.

Aldoses or sugars, such as, glucose, mannose, gulose, or idose and ketoses, such as, fructose, sorbose, tagatose, and the like can also be used.

Two preferred nitrogen-free softeners are triglycerol diisostearate and sorbitan monoisostearate. These are commercially available respectively from Henkel Corp. as Emerest 2462 and ICI Specialty Chemicals as Arlacel 987. Others can easily be synthesized by esterifying one or more of the fatty acids enumerated above with any of the polyols shown above in the presence of an acid or related catalyst.

Other preferred nitrogen-free softeners include: oleate and soft tallow derivatives of sorbitan, pentaerythritol, glycerol and other polyols.

Microemulsions of the above-described oxygenated hydrocarbons are prepared by first dispersing an anionic surfactant (for example the magnesium salt of paraffin sulfonate) in water and then mixing this dispersion with an electrolyte (such as, magnesium sulfate), a softener (such as, triglycerol diisostearate), a cosurfactant (such as, ethylene glycol monobutyl ether), and optionally a nonionic surfactant (a fatty alcohol ethoxylate containing about 5 to about 11 ethoxy groups). This formation of a microemulsion is carried out at room temperature with conventional mixers or agitators in commonly used laboratory, pilot plant or production reaction vessels.

Although in the preparation of the microemulsions of this invention it is preferred to employ about 2 to about 40% oxygenated hydrocarbon nitrogen-free softener, about 2 to about 30% anionic surfactant, from 0 to about 7% of an electrolyte, about 2 to about 30% of a cosurfactant and optionally from 0 to about 20% of a nonionic surfactant, it is preferred to use about 5 to about 20% oxygenated hydrocarbon nitrogen-free softener, about 4 to about 14% anionic surfactant, from 0 to about 3% of an electrolyte, about 6 to about 8% of a cosurfactant and optionally from 0 to about 5% of a nonionic surfactant the balance, to bring the total to 100%, being water.

Representative anionic surfactants in addition to those mentioned above are: C10–C16 alkyl or alkylbenzene sulfonates or sulfates. Representative cosurfactants include: (poly)ethylene glycol ethers, (poly)propylene glycol ethers and alcohols.

Representative nonionic surfactants include: C9–C11 fatty alcohol ethoxylates containing about 5 ethoxy groups, C12–C15 fatty alcohol ethoxylates containing about 7 ethoxy groups and the like. The role of the surfactant-cosurfactant entity is critical since the combination must serve the double function of first microemulsifying the nitrogen-free softener and later releasing it onto the textile fibers upon dilution with water. This release of the softener necessitates a destabilization or breaking of the microemulsion to effect as complete a deposition of softener on fabric as possible. If this action is too slow, softener remains microemulsified and is discarded with the rinse water. However the ideal state is not imperative in order to provide a commercial product.

FIGS. 4, 5 and 6 are ternary diagrams showing the microemulsification of triglycerol diisostearate.

The invention is further described in the examples which follow. Unless otherwise specified, all parts and percentages are by weight.

EXAMPLE 1

Preparation of Softener Microemulsions

Varying amounts of the following components were mixed at room temperature in conventional laboratory flasks with agitation:

(1) 1–10% of the anionic surfactant, magnesium paraffin sulfonate (MgPS)

(2) 1–10% Of the cosurfactant, ethylene glycol monobutyl ether (EGMBE)

(3) 0–9% of the nonionic surfactant, Dobanol 91–5, a C9–C11 fatty alcohol ethyoxylate containing 5 ethoxy groups (C9–C11 E5)

(4) 5% sorbitan isostearate (SIS) and (5) remainder 84% water.

Although the order of addition of the ingredients is not critical, the MgPS was added to the water first because it is the most difficult to disperse.

The EGMBE is available from BP Chemical Co., Shell Chemical Co. or ICI Specialty Chemicals Co.

The C9–C11 E5 was obtained from Shell Chemical Co. Dobanol 91–5.or can be synthesized by the oxyalkylation of a C9–C11 fatty alcohol as explained in The Encyclopedia of Polymer Science and Technology, Vol. 6, Pgs. 108–109, John Wiley and Sons Inc., NYC, 1967 incorporated herein by reference.

The SIS is commercially available from ICI Specialty Chemicals as ARLACEL 987 and has the structure:

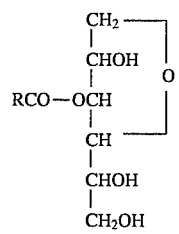

Figure 1:
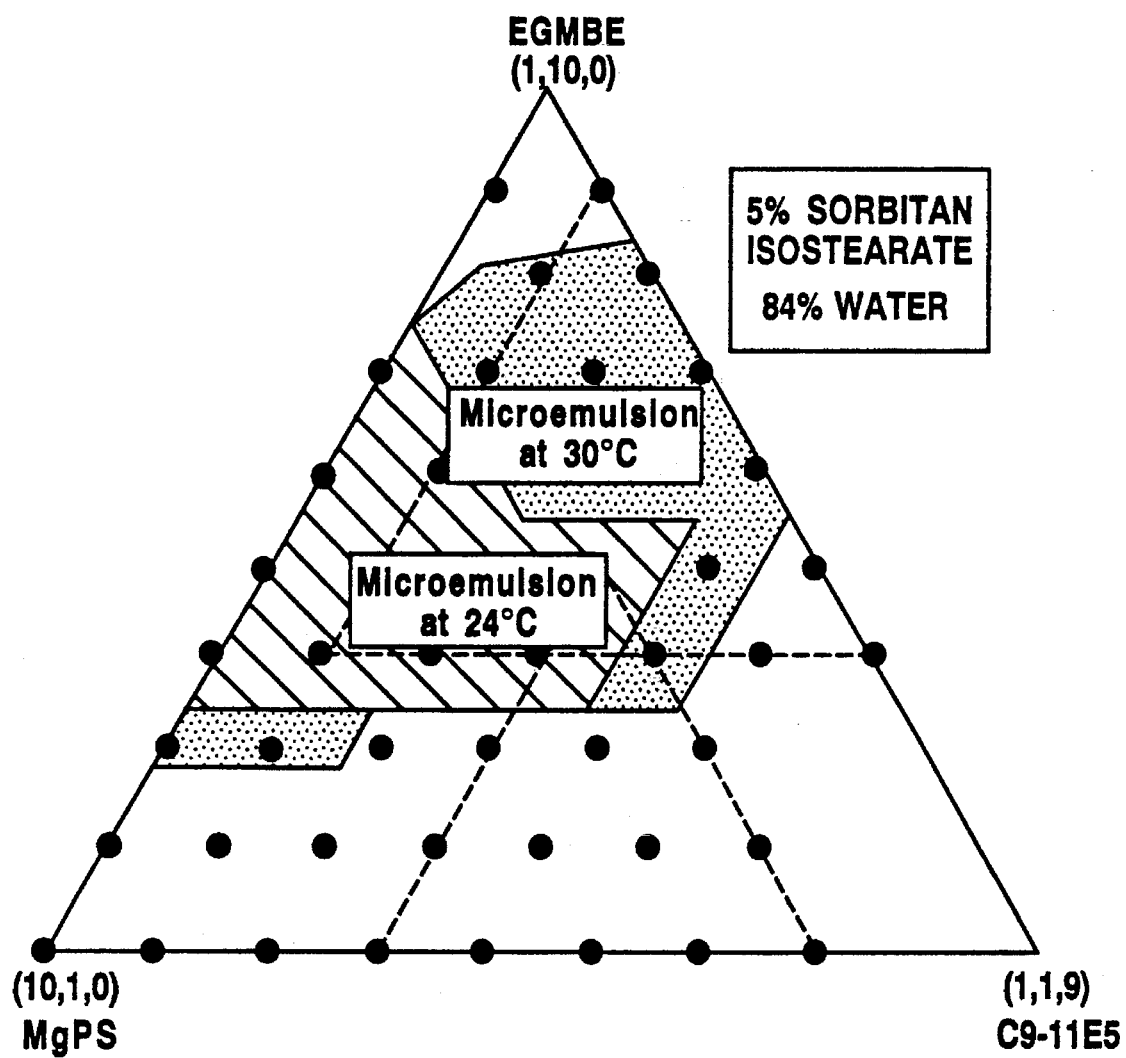
FIG. 1 is a ternary diagram showing the microemulsification of sorbitan isostearate.

The various combinations of the components were then observed to determine which afforded microemulsions. These data are presented in Table 1. A plot of these data as discrete points is shown in FIG. 1 as a ternary diagram. This figure shows combinations affording microemulsions of the softener SIS at 24° C. and 30° C.

TABLE 1

| MgPS[1] | C9-C11E_5[2] | EGMBE[3] | SIS[4] | Water | Product |
|---|---|---|---|---|---|
| 1 | 0 | 10 | 5 | 84 | no test |
| 2 | 0 | 9 | 5 | 84 | no me[5] |
| 1 | 1 | 9 | 5 | 84 | no me |
| 3 | 0 | 8 | 5 | 84 | no me |
| 2 | 1 | 8 | 5 | 84 | me > 30° C. |
| 1 | 2 | 8 | 5 | 84 | " |
| 4 | 0 | 7 | 5 | 84 | me |
| 3 | 1 | 7 | 5 | 84 | me > 30° C. |
| 2 | 2 | 7 | 5 | 84 | " |
| 1 | 3 | 7 | 5 | 84 | " |
| 5 | 0 | 6 | 5 | 84 | me |
| 4 | 1 | 6 | 5 | 84 | me |
| 3 | 2 | 6 | 5 | 84 | me > 30° C. |
| 2 | 3 | 6 | 5 | 84 | " |
| 1 | 4 | 6 | 5 | 84 | " |
| 6 | 0 | 5 | 5 | 84 | me |
| 5 | 1 | 5 | 5 | 84 | me |
| 4 | 2 | 5 | 5 | 84 | me |
| 3 | 3 | 5 | 5 | 84 | me |
| 2 | 4 | 5 | 5 | 84 | me > 30° C. |
| 1 | 5 | 5 | 5 | 84 | no me |
| 7 | 0 | 4 | 5 | 84 | me |
| 6 | 1 | 4 | 5 | 84 | me |
| 5 | 2 | 4 | 5 | 84 | me |
| 4 | 3 | 4 | 5 | 84 | me |
| 3 | 4 | 4 | 5 | 84 | me > 30° C. |
| 2 | 5 | 4 | 5 | 84 | no me |
| 1 | 6 | 4 | 5 | 84 | no me |
| 8 | 0 | 3 | 5 | 84 | me > 30° C. |
| 7 | 1 | 3 | 5 | 84 | me > 30° C. |
| 6 | 2 | 3 | 5 | 84 | no me |
| 5 | 3 | 3 | 5 | 84 | no me |
| 4 | 4 | 3 | 5 | 84 | no me |
| 3 | 5 | 3 | 5 | 84 | no me |
| 2 | 6 | 3 | 5 | 84 | — |
| 1 | 7 | 3 | 5 | 84 | — |
| 9 | 0 | 2 | 5 | 84 | no me |
| 8 | 1 | 2 | 5 | 84 | no me |
| 7 | 2 | 2 | 5 | 84 | no me |
| 6 | 3 | 2 | 5 | 84 | no me |
| 5 | 4 | 2 | 5 | 84 | no me |
| 4 | 5 | 2 | 5 | 84 | no me |
| 3 | 6 | 2 | 5 | 84 | no me |
| 2 | 7 | 2 | 5 | 84 | — |
| 1 | 8 | 2 | 5 | 84 | — |
| 10 | 0 | 1 | 5 | 84 | no me |
| 9 | 1 | 1 | 5 | 84 | no me |
| 8 | 2 | 1 | 5 | 84 | no me |
| 7 | 3 | 1 | 5 | 84 | no me |
| 6 | 4 | 1 | 5 | 84 | no me |
| 5 | 5 | 1 | 5 | 84 | no me |
| 4 | 6 | 1 | 5 | 84 | no me |
| 3 | 7 | 1 | 5 | 84 | no me |
| 2 | 8 | 1 | 5 | 84 | no test |
| 1 | 9 | 1 | 5 | 84 | no test |

[1]magnesium salt of paraffin sulfonate
[2]fatty alcohol ethoxylate-C9-C11[O—CH_2CH_2]_5—OH
[3]ethylene glycol monobutyl ether
[4]sorbitan isostearate
[5]me = microemulsion The breakdown of the softener microemulsion upon dilution in the rinse cycle is a necessary condition for releasing the active ingredient (softener) onto the laundered fabrics. This is indicated by the immediate appearance of turbidity upon dilution. This was verified by particle size distribution analysis delineated in Table 2. The results suggest that the microemulsion destabilization is due both to dilution and water hardness.

TABLE 2

Particle Size Analysis

| Composition | | | | Composition Mean Diameter(nm) | | |
|---|---|---|---|---|---|---|
| SIS | MgPS | EgMBE | NI | Neat | udi Water | Tap Water |
| 5 | 6 | 4 | 1 | 36 | 226 | 591 |
| 5 | 5 | 5 | 1 | 51 | 227 | 436 |
| 5 | 5 | 4 | 2 | 43 | 231 | 415 |
| 5 | 4 | 6 | 1 | 42 | 368 | 366 |
| 5 | 4 | 5 | 2 | 55 | 252 | 412 |
| 5 | 4 | 4 | 3 | 59 | 236 | 306 |

NI = nonionic surfactant
nm = nanometers
udi = ultradeionized water

EXAMPLE 2

Performance Evaluation of Softeners

The effect of microemulsification on the prototype softeners studied was assessed. These evaluations were carried out in a laboratory minisoftening machine on desized terry cloth towels in tap water. The prototype softener, SIS, as a microemulsion composition was compared with a reference Control A containing the microemulsification system with no softener. A test panel of 18 judges evaluated, in paired comparisons, swatches treated with the prototype and a Control for softness. Reference results, presented in Table 3 below, demonstrate the superiority of SIS in microemulsification form.

TABLE 3

Preference Evaluation

| | Composition | | | | Test Panel's Evaluation | | |
|---|---|---|---|---|---|---|---|
| | SIS | MgPS | EgMBE | NI | Proto-type | Control No | Pre-ference |
| a. | 4.5 | 3.6 | 3.8 | 5.7 | 8 | 5 | 5 |
| b. | 4.4 | 3.6 | 5.7 | 5.7 | 5 | 10 | 3 |
| c. | 5.0 | 4.0 | 4.0 | 3.0 | 14 | 2 | 2 |
| d. | 5.0 | 4.0 | 6.0 | 1.0 | 14 | 2 | 2 |
| e. | 5.0 | 6.0 | 4.0 | 1.0 | 18 | 0 | 0 |

A decrease of the nonionic surfactant causes an increase in softness. The sample (e) containing the highest MgPS level displayed a high efficiency and is significantly softer than sample (c). Samples (c) and (d) were found to be equivalent in softness.

The sensitivity of the claimed microemulsions of this invention to dilution and water hardness is still enhanced in nonionic surfactant-free compositions as suggested by the particle size distributions presented in Table 4. When tested as above, both (f) and (h) were found to soften the terry cloth fabric significantly. Among 18 judges all 18 preferred the prototype; none preferred the reference; and none had no preference.

TABLE 4

Particle Size Analysis

| Composition | | | | Composition Mean Diameter(nm) | | |
|---|---|---|---|---|---|---|
| SIS | MgPS | EgMBE | NI | Neat | udi Water | Tap Water |
| f.  5 | 5 | 6 | 0 | 63 | 371 | 1069 |
| g.  5 | 6 | 5 | 0 | 55 | 246 | 882 |
| h.  5 | 7 | 4 | 0 | 48 | 222 | 743 |
| i   5 | 6 | 4 | 1 | 36 | 226 | 591 |

NI = nonionic surfactant
nm = nanometers
udi = ultradeionized water

The data above shows that the microemulsification of sorbitan isostearate tolerates wide variations in the surfactant-cosurfactant system compositions which govern its softening performance. Too fast a destabilization of the microemulsion has been shown to prevent the system from delivering a full softening efficacy.

Figure 2:
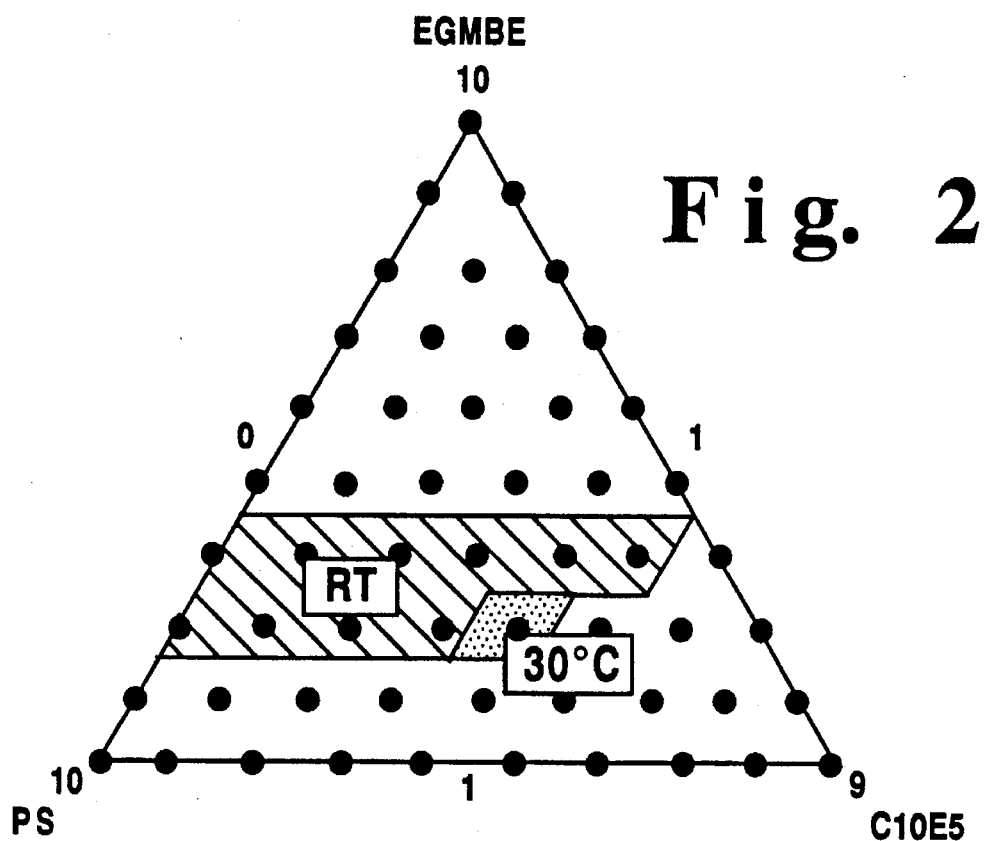
FIG. 2 is a ternary diagram showing the microemulsification of sorbitan isostearate sans Mg sulfate.

When sodium paraffin sulfonate (PS-Na) is used as the anionic surfactant without introducing magnesium sulfate, the microemulsion area obtained in Example 1 is much less sensitive to room temperature. This provides greater flexibility of formulation. As shown in FIG. 2 it then is shifted towards lower EGMBE levels.

Figure 3:
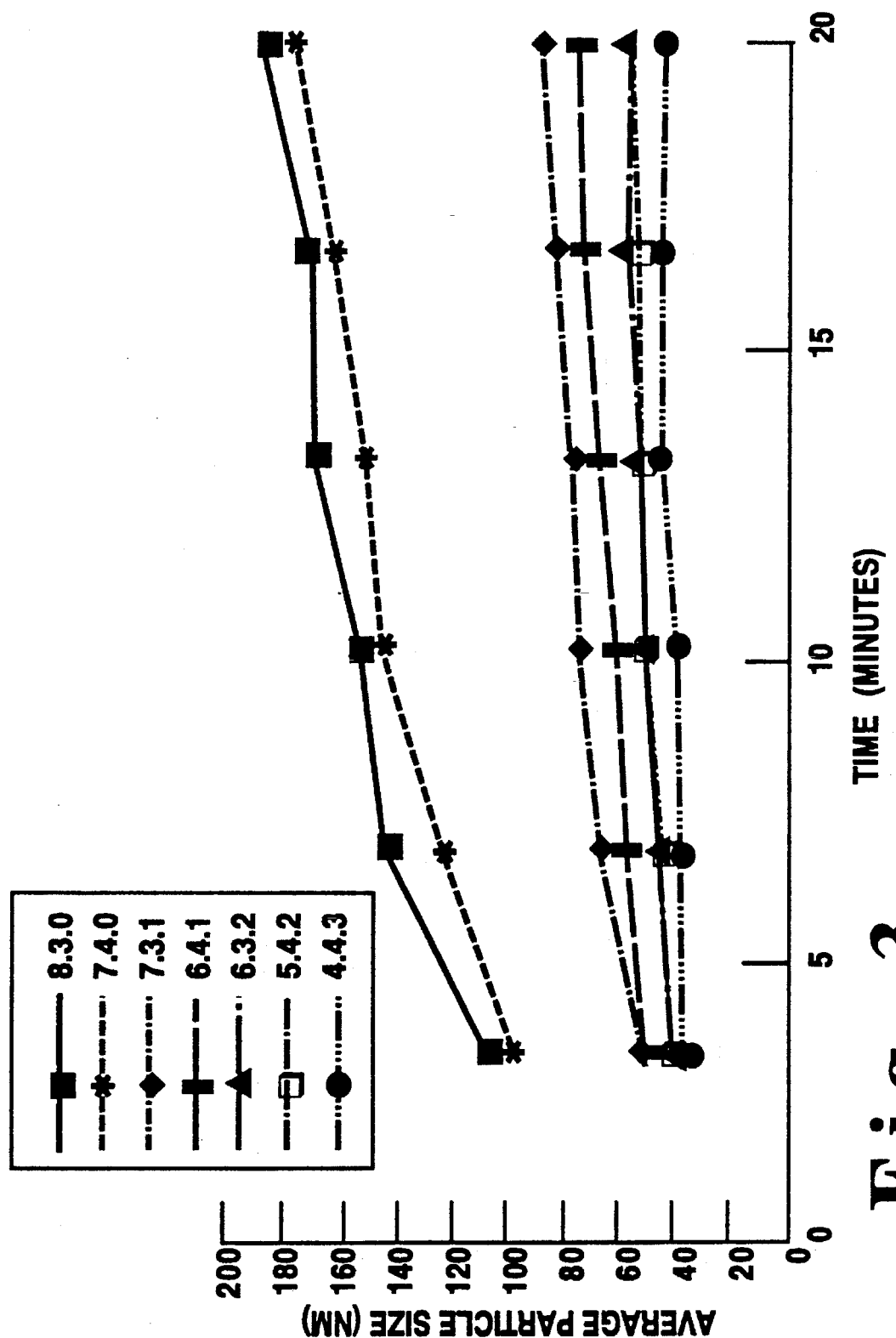
FIG. 3 is a kinetics graph of microemulsion flocculation.

In the absence of nonionic surfactant, the turbidity of these microemulsions only gradually appears after dilution with water as shown in FIG. 3. Samples containing nonionic surfactant even remain clear upon tap water addition. The presence of magnesium sulfate with or without nonionic detergent results in fast turbidity. The absence of both magnesium and nonionic detergent results in slow turbidity. The presence of nonionic detergent with no magnesium sulfate results in no turbidity. FIG. 3 is a plot of average particle size of the emulsion that forms (accompanied by the appearance of turbidity) versus time. When turbidity appears we no longer have a microemulsion (which is crystal clear) but an emulsion with greater particle size and a milky appearance. FIG. 3 thus demonstrates the kinetics of paraffin sulfonate based microemulsion flocculation in tap water.

The microemulsion area and behavior is not much affected by the nature of cations in solution. Sodium, ammonium, and caesium cations are equivalent. $Mg^{2+}$ interacts more strongly with the negatively-charged head of the surfactant, making the surfactant more hydrophobic. Other ions act by increasing the ionic strength, thus making the surfactant slightly more hydrophobic, or by improving the solubility of the surfactant ("salting-in" effect). The salting-in efficiency varies according to the following sequence: $Na<K<NH_4<Cs<Mg<Ca$. Other cations that can be used include Group Ia and Group IIa of the Periodic Chart of the Elements.

Conversely the microemulsion area is very sensitive to the kind of anions present. A salting out anion, such as sulfate, gives a much wider area than the neutral chloride anion.

The softening of swatches rinsed with SIS/PS/EGMBE/NI in a ratio of 5:7:4:0 was rated 2.0 on a scale where 0 corresponds to a rinse in tap water and 5 to a treatment with a 5% Quat emulsion (Praepagen WK from Hoechst). The rating rises to 2.5 if the rinse time is increased from 5 to 30 minutes. Under the same conditions, the softening of swatches rinsed with SIS/MgPS/EGMBE/NI in a ratio of 5:7:4:0 was rated 1.2.

EXAMPLE 3

Preparation of a Triglycerol Diisostearate Microemulsion

Using the procedure described in Example 1, a series of microemulsions of triglycerol diisostearate (TGDiS) was prepared. TGDiS is commercially available from Henkel Corp. of Hoboken, N,J. under the trade name Emerest 2462 and has the structure:

$$R-COOCH_2-CHOH-CH_2-O-CH_2-CHOH-CH_2-O-CH_2-CHOH-CH_2-OOC-R$$

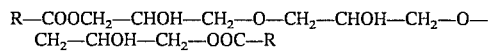

wherein $R=C_{17}H_{34}$

Magnesium sulfate was added in the beginning of the formulation.

Figure 6:
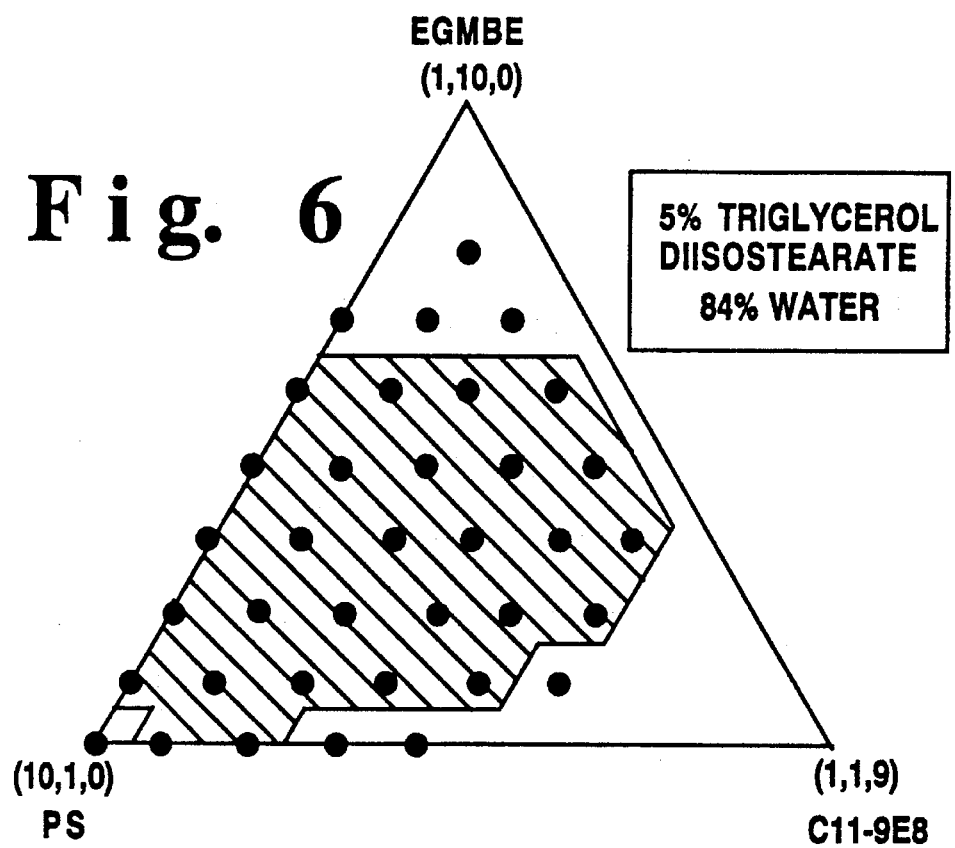

A systematic investigation showed that a wide microemulsion area exists in the domain of 1–8% MgPS, 2–9% EGMBE, and 0–5% C9–C11 fatty alcohol ethoxylate containing 5 ethyoxy moieties. This is delineated in FIG. 4. The microemulsion area is slightly modified when the nonionic surfactant degree of ethoxylation is increased from 8 to 12. If the magnesium sulfate is not added to these compositions, the microemulsion area remains wide and is displaced toward the PS apex in FIG. 6.

EXAMPLE 4

Preparation of a Fatty Alcohol Microemulsion

Using the procedure described in Example 1, a microemulsion of a commercially available C12–C14 fatty alcohol was prepared. The resultant microemulsion comprised 5% fatty alcohol, 4% paraffin sulfonate, 1.5% $MgSO4.7H_2O$, 6% hexylene glycol butyl ether, 3% ethylene glycol butyl ether and the remainder water. A second composition was prepared identical to the first with the exception that no fatty alcohol was included. A performance evaluation using the procedure described in Example 3 was performed. A panel of 10 judges preferred the microemulsion containing the fatty alcohol to that containing none.

Those skilled in the art will appreciate that the data presented supra illustrate the preparation of the first fully nitrogen-free fabric softener compositions in the form of a microemulsion and their utilization in the delivery of softness to fabrics.

These softener compositions may also contain additives, such as acrylate polymers or maleic anhydride-alkyl vinyl ether copolymers, perfumes, colorants, light stabilizers, whiteners, anti-static agents, bacteriostatic agents, and the like.

Although the test data shown employed desized terry cloth for the demonstration of the utility of the claimed softeners, this invention is not limited to this fabric. Other fabrics may be softened with said softeners including but not limited to cotton and cotton-containing items and the like.

These microemulsions provide for the first time a method of delivering a significant amount of active softeners to fabrics in very soft water. All previous systems require a significant level of hardness in the wash or rinse water to be fully efficient.

Another advantage of these microemulsions is that they permit the user to disperse very high concentrations of active softeners (about 20%) to the laundered fabric.

Still another facet of these microemulsions is their clarity which carries the concept of mildness to the user hence increasing their commercial acceptance.

Although the invention has been described with a certain amount of particularity, it is understood that the present disclosure of the preferred forms has been made only by way of example and that numerous changes and modifications can be resorted to without departing from the spirit and scope of the invention.

What is claimed is:

1. Method of preparing a nitrogen-free rinse cycle softener composition which comprises mixing at ambient room temperature:
   (A) water;
   (B) from 0 to about 7% of an electrolyte;
   (C) about 2 to about 30% of an anionic surfactant;
   (D) about 2 to about 30% of a cosurfactant;
   (E) about 2 to about 40% of a fatty acid polyol ester; and
   (F) from 0 to about 20% of a nonionic surfactant; wherein the amount of water is sufficient to bring the total composition to 100%.

2. Method claimed in claim 1 wherein the fatty acid polyol ester is triglycerol diisostearate.

3. Method claimed in claim 1 wherein the fatty acid polyol ester is sorbitan isostearate.

4. Method claimed in claim 1 wherein the anionic surfactant is a paraffin sulfonate.

5. Method claimed in claim 1 wherein the cosurfactant is an alkylene glycol monoalkyl ether.

6. Method claimed in claim 1 wherein the nonionic surfactant is a fatty alcohol ethoxylate containing about 5 to about 11 ethoxy groups.

7. Method claimed in claim 1 wherein the electrolyte is magnesium sulfate.

* * * * *